Figure 1:
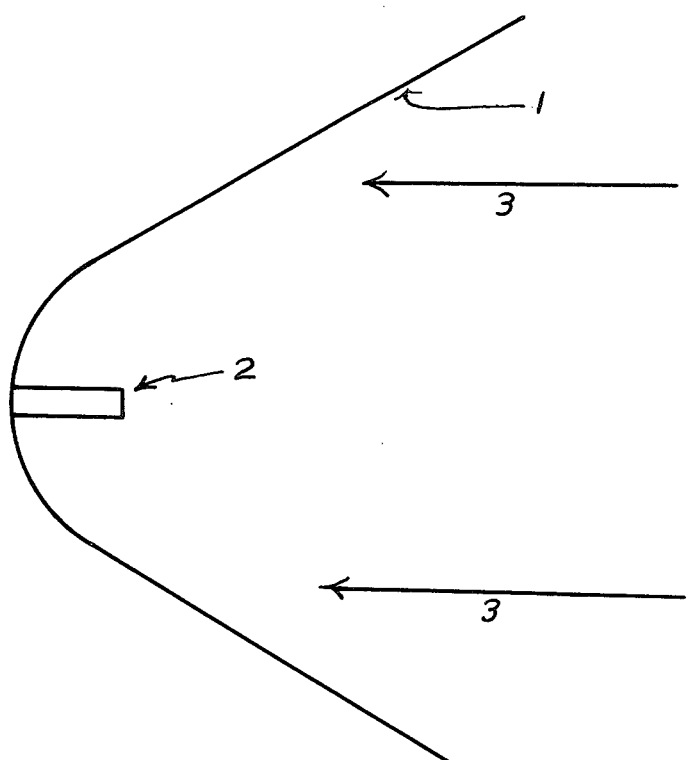

United States Patent [19]

Holland

[11] 4,266,858
[45] May 12, 1981

[54] SOLAR CONCENTRATOR OF WIDE-ANGLE CAPABILITY

[76] Inventor: Beecher J. Holland, 600 Morison Ave., Kingsport, Tenn. 37660

[21] Appl. No.: 68,891

[22] Filed: Aug. 23, 1979

Related U.S. Application Data

[63] Continuation of Ser. No. 822, Jan. 4, 1979, abandoned.

[51] Int. Cl.³ .............................................. G02B 5/10
[52] U.S. Cl. .................................................. 350/296
[58] Field of Search ................ 350/296, 293; 126/438, 126/439

[56] References Cited

U.S. PATENT DOCUMENTS

| | | | |
|---|---|---|---|
| 3,923,381 | 12/1975 | Winston | 126/439 |
| 4,002,499 | 1/1977 | Winston | 350/296 |
| 4,003,638 | 1/1977 | Winston | 126/439 |
| 4,024,852 | 5/1977 | L'Esperance et al. | 350/293 |
| 4,045,246 | 8/1977 | Mlavsky et al. | 126/439 |
| 4,099,516 | 7/1978 | Caulier | 126/445 |

FOREIGN PATENT DOCUMENTS

2717108  11/1978  Fed. Rep. of Germany ........... 126/438

*Primary Examiner*—Jon W. Henry

[57] ABSTRACT

The invention is a solar-radiation concentrator of wide-angle capability which will receive solar radiation of existing intensity onto a reflecting surface and reflect it onto receiving-converting means of smaller surface area, which at the reflector base coexists with the imagined continuation of the reflecting surface, so as to achieve a greater intensity of radiation to said means.

1 Claim, 1 Drawing Figure

SOLAR CONCENTRATOR OF WIDE-ANGLE CAPABILITY

This application is a continuation of Ser. No. 000,822, filed Jan. 4, 1979, and now abandoned.

The present invention relates to solar radiation concentrators, specifically one which acts with incoming radiation incident to the longitudinal centerline of a sectional view by angles beyond the capability of the common parabolic concentrators. That is, it has wide-angle capability. The invention is, in a sectional view, an assembly of (a) a concave reflector of circular section having tangential extensions and (b) a receiving-converting means which extends outward by less than one radius of said circular section from the base within the cavity formed by the reflector and symmetrically along its longitudinal center line. The receiving-converting means is actually coincident with the imaginary continuation of the reflector surface at the reflector base. Such coincidence is important because a significant portion of the energy received by the reflector gathers in this area and aids in producing higher concentrations than are available with previous devices of similar cross section where the collector is only near the base of the reflector.

Maximum degree of concentration, using extensions of three diameters of said circular section, is seen as around 4.6 for a linear (wherein the invention sectional view exists all along the path of a straight line) model and around 50 for a hemispherical embodiment.

The object of the invention is to offer a degree of solar-radiation concentration in excess of that available with previous devices of similar cross section and having wide-angle capability.

The object, design and functioning of the invention will be clarified hereinafter by the specification with reference to the accompanying drawing wherein:

FIG. 1 is a sectional view of the invention.

Referring to FIG. 1, the solar radiation concentrator consists of the assembly of (a) a reflecting means surface 1 comprising a circular section and tangential extensions and of (b) reciveing-converting means 2 extending outward by less than one radius of said circular section from the base within the cavity formed by the reflector and symmetrically about the longitudinal centerline of the sectional view. The receiving-converting means 2 actually is coincident with the imagined continuation of the reflector surface in the reflector base area occupied by said means. Such coincidence aids in producing high concentrations.

I claim:

1. A solar radiation concentrator which in sectional view consists of an assembly of (a) a concave reflector of circular section having tangential extensions and (b) a receiving-converting means which extends outward by less than one radius of said circular section from the base within the cavity formed by the reflector and symmetrically along its longitudinal center line, and wherein the receiving-converting means is coincident with the imaginary continuation of the reflector surface at the reflector base.

* * * * *